(12) United States Patent
Shen

(10) Patent No.: US 8,357,901 B2
(45) Date of Patent: *Jan. 22, 2013

(54) INFRARED SENSORS, FOCAL PLANE ARRAYS AND THERMAL IMAGING SYSTEMS WITH TEMPERATURE COMPENSATION

(75) Inventor: Chongfei Shen, Shanghai (CN)

(73) Assignee: Shanghai Juge Electronics Technologies Co. Ltd., Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 13/370,157

(22) Filed: Feb. 9, 2012

(65) Prior Publication Data

US 2012/0138797 A1 Jun. 7, 2012

Related U.S. Application Data

(63) Continuation of application No. 12/680,186, filed as application No. PCT/CN2007/002845 on Sep. 28, 2007, now Pat. No. 8,143,577.

(51) Int. Cl.
*G01J 5/52* (2006.01)
(52) U.S. Cl. .......... 250/338.1; 250/332; 250/338.4
(58) Field of Classification Search .......... 250/338.1
See application file for complete search history.

(56) References Cited

U.S. PATENT DOCUMENTS

| | | | |
|---|---|---|---|
| 6,583,416 B1 | 6/2003 | Villani | |
| 6,770,882 B2 | 8/2004 | Carr et al. | |
| 7,402,803 B1 | 7/2008 | Wagner et al. | |
| 7,522,328 B2 | 4/2009 | Wagner et al. | |
| 7,848,382 B2 | 12/2010 | Weida et al. | |
| 2003/0132386 A1 | 7/2003 | Carr et al. | |
| 2003/0141453 A1 | 7/2003 | Reed et al. | |
| 2006/0118721 A1* | 6/2006 | Antoszewski et al. | 250/338.4 |
| 2007/0023661 A1 | 2/2007 | Wagner et al. | |
| 2007/0194237 A1 | 8/2007 | Wagner et al. | |
| 2008/0088906 A1 | 4/2008 | Wagner et al. | |
| 2009/0159798 A1 | 6/2009 | Weida et al. | |
| 2009/0195859 A1 | 8/2009 | Wagner et al. | |

FOREIGN PATENT DOCUMENTS

| | | |
|---|---|---|
| CN | 1427251 | 7/2003 |
| CN | 2703328 | 6/2005 |
| CN | 1699939 | 11/2005 |
| CN | 1904568 | 1/2007 |

OTHER PUBLICATIONS

Feng et al., J. Infrared Millim. Waves (2004) 23(2):125-130.
Grbovic, "Uncooled infrared imaging using bimaterial microcantilever arrays," Applied Physics Letters (2006) 89(7):073118.

(Continued)

*Primary Examiner* — Marcus Taningco
(74) *Attorney, Agent, or Firm* — Huanyong Gao; Sheppard, Mullin, Richter & Hampton LLP

(57) ABSTRACT

An infrared sensor and infrared imaging system, wherein said infrared sensor comprises: a first film structure, a second film structure, a gap between said first film structure and said second film structure. Reference light is incident from one of said first film structure and said second film structure. When said gap distance changes, the intensity of transmitted reference light changes, and the intensity of reflected reference light changes. When infrared light is incident, at least one of the said first and second film structures absorbs infrared light and the temperature changes, causing said gap distance to change. By detecting the intensity of said transmitted reference light or reflected reference light, the incident infrared light can be measured. An infrared sensor and infrared imaging system also include a temperature compensation mechanism, and are insensitive to the fluctuations of the environmental temperature.

46 Claims, 7 Drawing Sheets

OTHER PUBLICATIONS

International Search Report for PCT/CN2007/002845, mailed on Jun. 26, 2008, 4 pages.
Written Opinion of the International Searching Authority for PCT/CN2007/002845, mailed on Jun. 26, 2008, 6 pages.
Notice of Allowance for U.S. Appl. No. 12/680,186, mailed Nov. 8, 2011, 7 pages.
Corrected Notice of Allowance for U.S. Appl. No. 12/680,186, mailed Dec. 19, 2011, 4 pages.
Amendment After Allowance for U.S. Appl. No. 12/680,186, filed Feb. 8, 2012, 7 pages.

* cited by examiner

INFRARED SENSORS, FOCAL PLANE ARRAYS AND THERMAL IMAGING SYSTEMS WITH TEMPERATURE COMPENSATION

CROSS REFERENCE TO RELATED APPLICATIONS

This application is a continuation of U.S. patent application Ser. No. 12/681,186, filed Mar. 25, 2010, now allowed, which is a U.S. National Stage of International Application No. PCT/CN2007/002845 filed Sep. 28, 2007. The contents of these applications are incorporated herein by reference in their entirety.

TECHNICAL FIELDS

This invention relates to infrared sensors, focal plane arrays and thermal imaging systems, especially infrared sensors, focal plane arrays and thermal imaging systems for detecting infrared lights emitted by objects.

TECHNICAL BACKGROUND

Infrared sensors detect infrared emission from objects at wavelength between about 8 μm to 14 μm that are not visible to human eyes, CCD or CMOS cameras. Traditional infrared sensors are fabricated using narrow band gap semiconductors or microbolometers, and they are difficult to make and expensive. Currently, there are some technologies that convert infrared signals into visible signals, and obtain the infrared image by calculating the infrared signal from the detected visible signals. One technology uses Micro-Electro-Mechanical Systems (MEMS) technology to manufacture infrared sensor array, i.e., focal plane array (FPA). In these structures, the supporting beams are made of different materials having different coefficients of thermal expansion (CTE), and when the absorbing plate absorbs incident infrared light, and transmits the absorbed heat to the supporting beams, the temperature of the supporting beams rises, and the supporting beams and the absorbing plate (also acts as a reflecting plate) bend, causing the reflected visible light to deflect. The intensity of the incident infrared light can be calculated by detecting the deflection angle of the visible light. This method measures the deflection of the visible lights, and involves complicated readout optical setup. Its manufacturing process is also difficult to control.

There are other technologies that convert infrared signals into visible signals, such as described by CN1427251A. The technology uses optical crystal which is difficult for production. The optical setup is also complicated, and the detected infrared light is from active infrared illumination, not infrared light emitted from objects.

Therefore, a simple, efficient, sensitive and accurate infrared sensor is needed for detecting infrared lights emitted by objects.

This invention provides a novel infrared sensor, focal plane array, and infrared imaging system for detecting infrared emissions from objects. This invention overcomes the disadvantages of existing technologies, and can accurately and speedily detect infrared emissions from objects, and convert the infrared emissions to images.

In accordance with one aspect of this invention, it is provided an infrared sensor that detects infrared emission from objects, wherein said infrared sensor comprises a first film structure, a second film structure, and a gap between said first film structure and said second film structure. When a reference light is incident on one of said first film structure and said second film structures, it is partially reflected and partially transmitted through the other film structure. When said gap between said two film structures changes, the intensity of the reflected reference light changes, as well as the intensity of the transmitted reference light. When an infrared light is incident, at least one of said first film structure and said second film structure absorbs incident infrared light, changes its temperature, and causes the gap to change consequently. By detecting the changes in the intensity of the reflected or transmitted reference light, the incident infrared light can be measured.

In accordance with another aspect of this invention, said infrared sensor further comprises a substrate, one or more first supporting mechanisms that support said first film structure on said substrate, wherein said second film structure is located directly on said substrate.

In accordance with another aspect of this invention, said infrared sensor comprises a substrate, one or more first supporting mechanisms that support said first film structure on said substrate; and one or more second supporting mechanisms that support said second film structures on said substrate.

In accordance with another aspect of this invention, said first supporting mechanism or said second supporting mechanism has the same layer structures as said first film structure or second film structure that it supports.

In accordance with another aspect of this invention, said second film structure and said substrate is an integrated structure.

In accordance with another aspect of this invention, part of said substrate is etched away to form an empty space. Said reference light is incident from the empty space and incident on said first film structure and said second film structure or incident on said first film structure and said second film structure and passes through said empty space. Infrared light is incident from the empty side or, from the opposite direction, incident to said first film structure or said second film structure.

In accordance with another aspect of this invention, to increase the absorption of the infrared light by the sensor, one of said first film structure and second film structure that is away from the incident infrared light is an infrared reflective film, or consists of an infrared reflective film on the upper surface, lower surface or somewhere in the middle. The infrared reflective film as described in this invention is film made of materials that have strong reflectivity for infrared emissions, including all conductive materials, such as metal and transparent conductive material such as ITO. In accordance with another aspect of this invention, transparent conductive materials such as ITO, InZnO and ZnO are used to make the infrared reflective film in the transmission mode.

In accordance with another aspect of this invention, in order to increase infrared absorption by the sensor, one of said first film structure and said second film structure that is on the incident infrared light side is an infrared absorbing film, or consists of an infrared absorbing film on the upper surface, lower surface, or somewhere in the middle. The infrared absorbing film as described in this invention is film made of materials that have strong absorption for infrared emissions at wavelength between 8 μm to 14 μm, including materials that have absorption peak for infrared lights at wavelength between 8 μm to 14 μm.

In accordance with another aspect of this invention, said first supporting mechanism of the sensor comprises a beam having one end attached to said first film structure and another end attached to said substrate, said second film structure, or said second supporting mechanism; an additional layer attached with said beam. Said second supporting mechanism comprises a beam having one end attached to said second film structure and another end attached to said substrate; an additional layer attached with said beam. Said beam consists of a material or material combination with a first CTE, said additional layers consist of a material or material combination with a second CTE. Said first CTE is different from said second CTE. Said first and second supporting mechanisms include straight beams, spin-wheel structures, and symmetric structures.

In accordance with another aspect of this invention, part of said beam has additional layer on the upper surface, and part of said beam has additional layer on the lower surface.

In accordance with another aspect of this invention, said first or said second mechanism is a microbridge that supports said first film structure or the second film structure. Said microbridge has at least two beams. Said beams may not have an additional layer.

In accordance with another aspect of this invention, in said infrared sensor, said first and second supporting mechanisms bend in the same direction when the environment temperature changes so as to keep the gap between said two film structures unchanged. Said environment temperature as described in this invention is the temperature of the environment in which the infrared sensor is located, not the temperature of the objects that the sensor detects.

In accordance with another aspect of this invention, said first film structure and said second film structure are reflective mirrors respectively, creating interference between said first film structure and said second film structure.

In accordance with another aspect of this invention, said first film structure and said second film structure consist of multiple layers of materials. Said multiple layers of materials include symmetric structure, wherein the types of materials are vertically symmetric while the thickness of layers may or may not be symmetric, such as 100 nm SiNx/100 nm SiO2/200 nm a-Si/120 nm SiO2/80 nm SiNx.

In accordance with another aspect of this invention, said first film structure, said second film structure consist of a single layer or multiple layers of materials. Said single layer or multiple layers of materials include silicon oxide (SiO2), silicon nitride (SiNx) or amorphous silicon (a-Si).

In accordance with another aspect of this invention, said first film structure and said second film structure consist of multiple layers of materials. Said multiple layers of materials include 5 layers of symmetric materials: a-Si/SiO2/a-Si/SiO2/a-Si, or SiNx/SiO2/a-Si/SiO2/SiNx.

In accordance with another aspect of this invention, said first film structure and said second film structure consist of a single layer or multiple layers of materials. The thickness of each layer in said single layer or multiple layers of materials is quarter wavelength of the reference light in the material.

In accordance with another aspect of this invention, said first supporting mechanism or second supporting mechanism includes: one or more beams consist of one or more materials with a first CTE; multiple additional layers attached to said beams, wherein said additional layers consist of one or more materials with a second CTE; wherein said additional layers are arranged such that: when the environment temperature changes, said first supporting mechanism or said second supporting mechanism bend in such a way that the displacements cancel each other and the gap keeps unchanged. When there is incident infrared light, the temperature of at least one of said first film structure and said second film structure rises, causing said first supporting mechanism or said second supporting mechanism to bend, the combination of all the bending results in a change in said gap distance.

In accordance with another aspect of this invention, said first or second supporting mechanism consists of three sections: a first section that is close to the substrate or has good thermal contact with the substrate, a second section that is close to said film structure that is supported by said supporting mechanism or has good thermal contact with said film structure, and a third section that is thermally insulating and located between the above two sections. In accordance with another aspect of this invention, in said first or second supporting mechanism, said first section that is close to the substrate or has good thermal contact with the substrate and second section that is close to said film structure that is supported by said supporting mechanism or has good thermal contact with said film structure bend in opposite directions when the temperature changes.

In accordance with another aspect of this invention, said first or second supporting mechanism contains first additional layer or layers and second additional layer or layers, wherein said first additional layer or layers and second additional layer or layers has two sections. Said total four sections are arranged as following: first section of first additional layer or layers, second section of first additional layer or layers, first section of second additional layer or layers, and second section of second additional layer or layers are sequentially attached to the beam, wherein first section of first additional layer or layers and second section of second additional layer or layers are attached to the same side of the beam; said second section of said first additional layer or layers and said first section of the second additional layer or layers are attached to the same other side of the beam.

In accordance with another aspect of this invention, at least one film structure in said first film structure and said second film structure absorbs light at wavelength outside of the infrared light spectrum, and the sensor is used to detect lights at such wavelength.

In accordance with another aspect of this invention, said substrate contains other devices or circuits, such as CMOS or CCD imaging devices or circuits.

In accordance with another aspect of this invention, when said infrared sensor operates at transmission mode, said infrared reflective film is transparent to said reference light. When said infrared sensor operates at reflectance mode, said infrared reflective film structure is transparent to said reference light or is metal.

In accordance with another aspect of this invention, a blind pixel is provided to sense the environment temperature of the sensor. Said blind pixel comprises a substrate, a first film structure, a second film structure, a gap between said first film structure and said second film structure. Reference light is incident on one of said first film structure and said second film structure, and transmits from the other film structure. When said gap changes, the intensity of said reflected reference light or said transmitted reference light changes. At least one of said first film structure and said second film structure absorbs infrared light and has good thermal contact with said substrate. When infrared light is incident on said first film structure and said second film structure, said gap between said first film structure and said second film structure does not change. When environment temperature changes, said gap distance changes. By detecting change in the intensity of said transmitted reference light from said second film structure, the environment temperature of the device is measured. Furthermore, the supporting mechanism of said blind pixel has high thermal conductivity, or has a large width, thickness or cross section area, or has multiple beams that increase the thermal conductivity between said first film structure or said second film structure and said substrate.

In accordance with another aspect of this invention, the film structure between said first film structure and said second film structure of said blind pixel that is at the same side of the incident infrared light is an infrared reflective film, or contains an infrared reflective film on the upper surface, lower surface, or somewhere in the middle.

Another blind pixel comprises: a substrate, a first film structure attached to the substrate, a medium attached to the first film structure, and a second film structure attached to the medium, wherein said first film structure, medium and second film structure forms an interferometer. When infrared light is incident on said first film structure and said second film structure, the refractive index of said medium does not change. When environment temperature changes, the refractive index of said medium changes, causing the intensities of the transmitted reference light and the reflected reference light from said first film structure and said second film structure to change. By detecting the change in the intensity of said transmitted reference light from said second film structure or said reflected reference light, the environment temperature of the device is measured.

In accordance with another aspect of this invention, said interferometer is connected to the substrate by a supporting mechanism, and has good thermal contact with the substrate.

In accordance with another aspect of this invention, said interferometer contains infrared reflective film on the upper surface, lower surface, or somewhere in the middle.

In accordance with another aspect of this invention, a focal plane array is provided that contains one or more of the infrared sensors of this invention. Furthermore, another focal plane array is provided that contains one or more of the blind pixels provided in this invention.

In accordance with another aspect of this invention, an infrared imaging system is provided that contains: a reference light source, a focal plane array in accordance with this invention, a detector for detecting the intensity of the reference light. The reference light source can be a LED; the detector can be a CCD or CMOS imaging chip.

This invention utilizes the principle of optical interference and has high sensitivity. Directly detecting the intensity of transmitted or reflected light, not deflection, is easy to implement. This invention uses the gap as a resonance cavity. The suspending reflecting layer is just a reflective film structure and has low thermal capacity. As a result, the sensor has fast response time. The gap changes sensitively when the temperature changes, and the sensor has high temperature resolution.

ILLUSTRATION OF THE DRAWINGS

The following figures are used to illustrate the preferred embodiments of this invention, as well as the purpose, characteristics and advantages of this invention.

FIG. 1A-C shows an infrared sensor according to one embodiment of this invention.

FIG. 1D-F shows infrared sensors according to other embodiments.

Figures 2A, 2B, 2C:
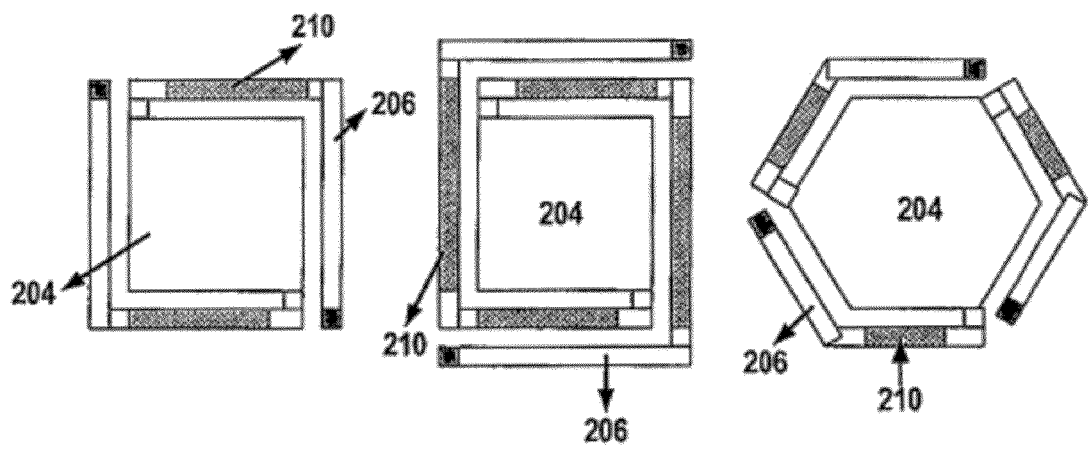

FIG. 2A-C shows the spinwheel structure beams of the infrared sensor according to one embodiment.

Figure 3A:
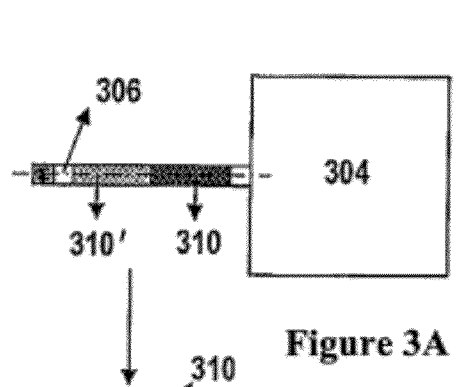
Figure 3C:
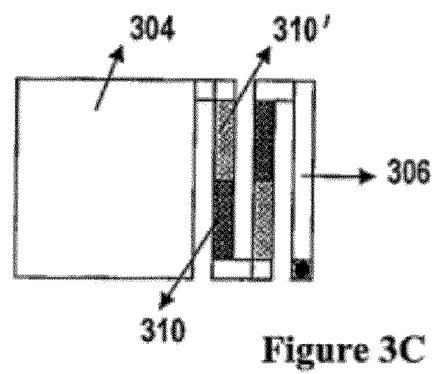
Figure 3B:
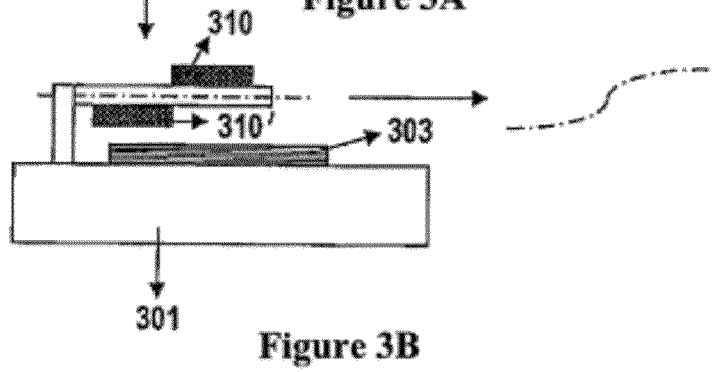

FIG. 3A-C shows the single beam structure according to another embodiment.

Figure 4A:
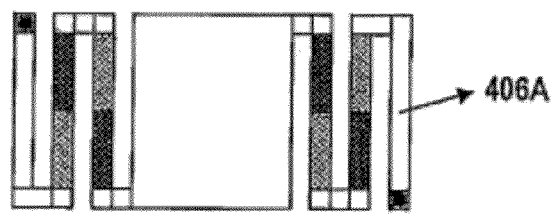
Figure 4B:
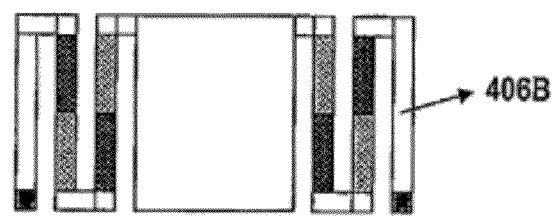

FIG. 4A-B shows two reflexed beam structures according to another embodiment.

Figure 5A:
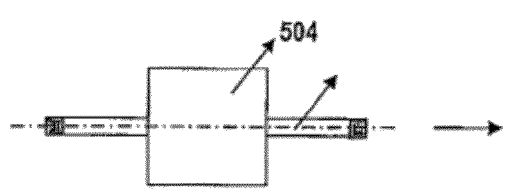
Figure 5B:
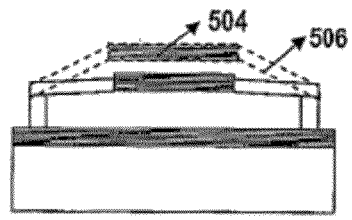
Figure 6A:
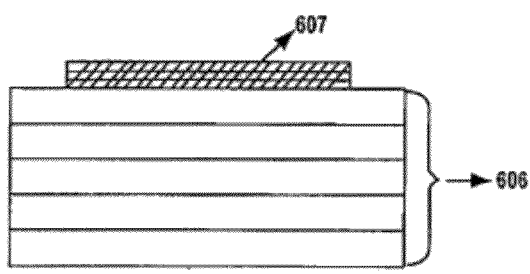
Figure 6B:
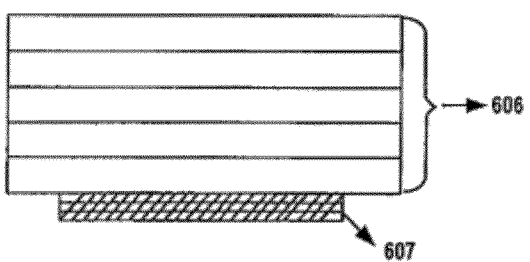
Figure 6C:
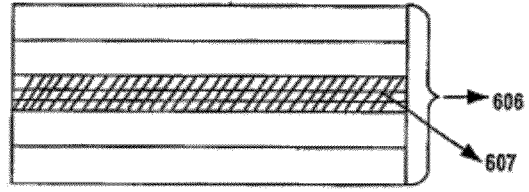
Figure 6D:
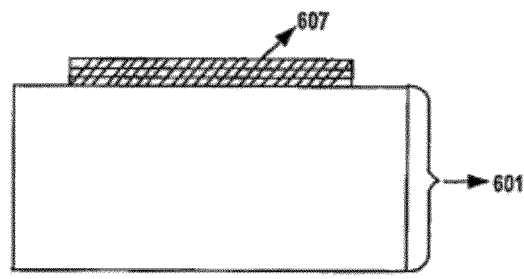

FIG. 5A-B shows the top view and cross-section of a microbridge structure according to one embodiment.

FIG. 6A-D shows various positions of the infrared reflective film structure in the infrared sensor for enhancing infrared reflecting according to one embodiment.

Figure 7A:
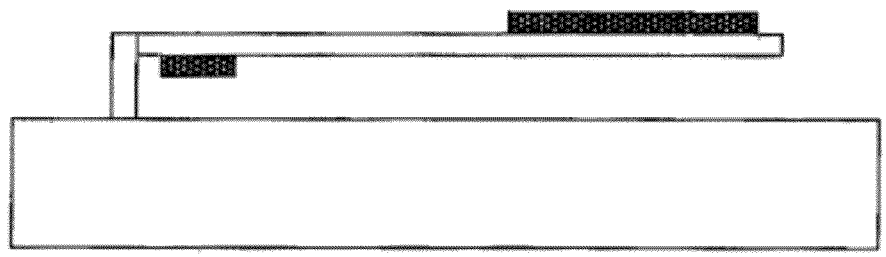
Figure 7B:
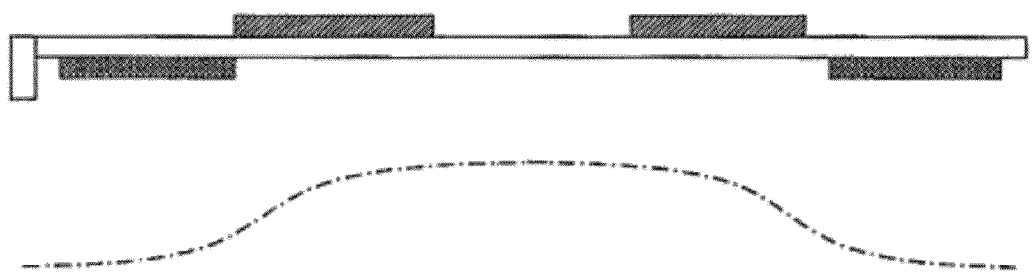
Figure 7C:
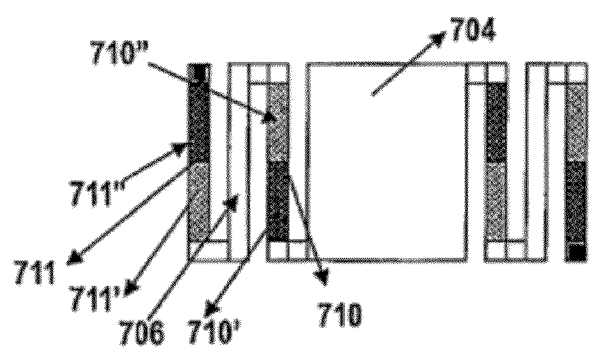

FIG. 7A-C shows the beam structure used for temperature compensation according to one embodiment. The dashed line illustrates the bending of the beam as temperature changes.

Figure 8:
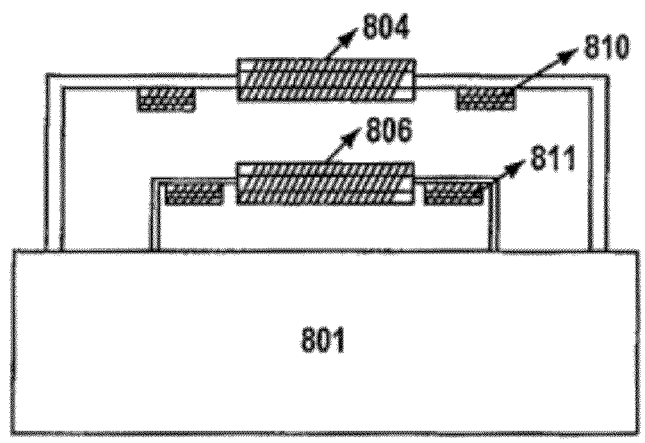

FIG. 8 shows a structure with a first suspending reflective film structure and a second suspending reflective film structure used for temperature compensation according to another embodiment.

Figure 9A:
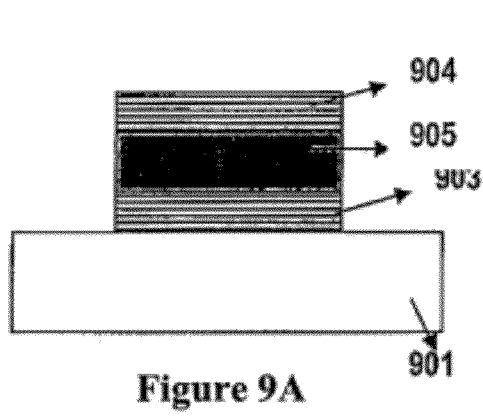
Figure 9B:
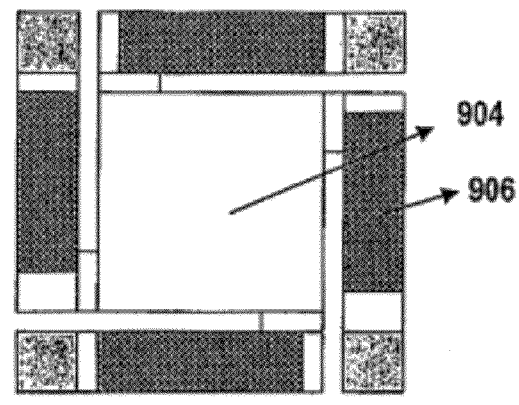
Figure 9C:
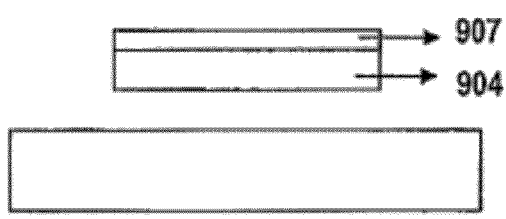

FIG. 9A-C shows the structure of blind pixels according to one embodiment of the invention.

SPECIFIC EMBODIMENTS

Various embodiments of the invention will be described in accordance with the following drawings.

Figure 1B:
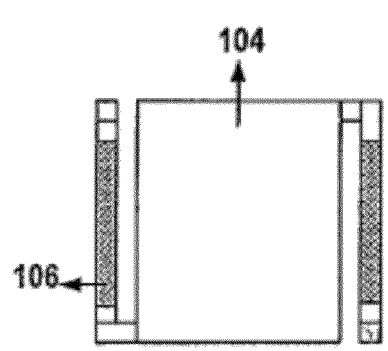
FIG. 1G shows the spectrum of the infrared sensor and the reference light according to one embodiment of this invention.
FIG. 1H shows the spectrum of the infrared sensor according to another embodiment.
Figure 1A:
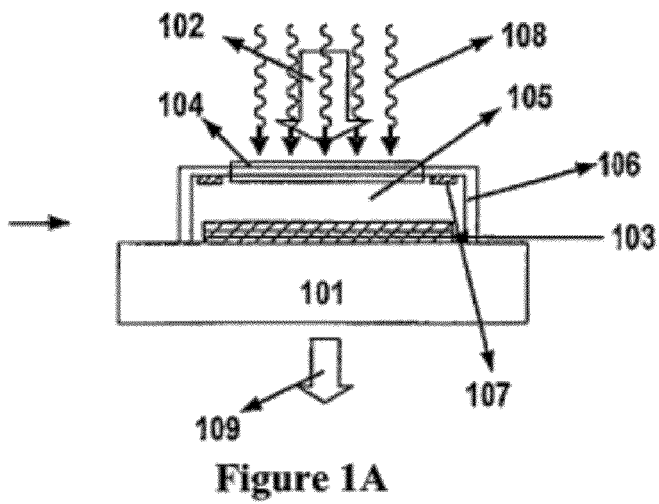
Figure 1C:
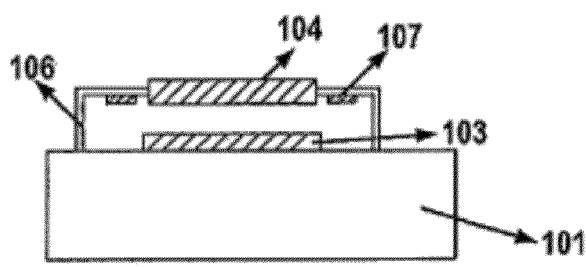

FIGS. 1A-C shows one embodiment of an infrared sensor described in this invention. As shown in FIGS. 1A-C, the infrared sensor comprises a substrate (101), a reflective layer (103) that is above the substrate or suspended above the substrate, a suspended reflective layer (104) that is above the reflective layer (103) and forms a gap between the suspending reflective layer (104) and the reflective layer (103), and a beam (106) which supports the reflective layer (104) over the substrate (101). Alternatively, beam (106) supports the reflective layer (104) over the reflective layer (103), as shown in FIG. 5B. In FIGS. 1A-C, the substrate (101) can be silicon or other semiconductor materials. If the infrared sensor operates at transmission mode, the substrate (101) needs to be transparent to the incident reference light (102). Preferably, substrate (101) can be glass, other transparent materials, or non-transparent materials with the materials etched away at where the reference light needs to pass.

The lower reflective layer (103) is attached on the substrate (101). It often comprises layers of two alternative materials with different refractive indices. The thickness of each layer is quarter wavelength of the reference light in the material, i.e., vacuum wavelength divided by the refractive index. Such a structure forms a Brag reflector and has high reflectivity to the reference light. The reflective layer (103) can comprise materials such as SiO2 and a-Si. Preferably, the reflective layer (103) is a symmetric 5 layer structure: a-Si/SiO$_2$/a-Si/SiO$_2$/a-Si, the thickness of each layer is quarter wavelength of the reference light in the material.

The structure of the suspended reflective (104) is similar to that of reflective layer (103). The suspended reflective layer (104), reflective layer (103) and the gap (105) between the two layers form a Fabry-Perot interferometer. The suspended reflective layer (104) often comprises layers of two or more materials with different refractive indices. The thickness of each layer is quarter wavelength of the reference light in the material. The reflective layer (104) can comprise materials such as SiO2 and a-Si. The suspended reflective layer (104) often comprises a material that has high absorption co-efficiency at the infrared wavelength, called infrared absorbing materials in this invention. The film that consists of infrared absorbing material(s) is called infrared absorbing film. Materials that have an absorption peak between wavelength 8 um to 14 um is called infrared absorbing materials. One example is silicon nitride (SiNx), which has an absorption peak around 11.4 um. Preferably, the suspending reflective layer (104) is a 5 layer structure: SiNx/SiO$_2$/a-Si/SiO$_2$/SiNx.

The interferometer formed by the suspending reflective layer (104), the reflective layer (103) and the gap (105) selectively passes light at certain wavelength. The transmitted light is the reference light in this embodiment of the invention. The suspending reflective layer (104) and the reflective layer (103) can be reflective mirrors, respectively. There might be one or more beams (106). Each beam (106) is connected to the substrate (101) or the reflective layer (103) at one end, and is connected to the suspending reflective layer (104) at the other end. The beam supports the suspending reflective layer (104), and is also a thermal insulator. The smaller the cross-section, the longer the beam and the less the thermal conductivity, the better is the thermal insulation.

In this embodiment of the invention, an additional layer (107) is attached to the beam (106). The CTE of the additional layer (107) is different from that of the beam (106). Preferably, the CTE of the additional layer (107) is larger than that of the beam (106). For example, the CTE of the additional layer (107) is larger than that of the beam (106) by 50%, or smaller by 35%. Preferably, the additional layer (107) is a metal layer and the beam (106) is a non-metal layer.

Because the beam is thermally insulating, when the suspending reflective layer (104) absorbs infrared light, and its temperature rises, the heat is not immediately conducted to the substrate, but raise the temperature of the beam (106) and the additional layer (107). Thus, it creates a temperature gradient between suspending reflective layer (104) and the substrate. As a result, when the temperature of the suspending reflective layer (104) rises because of the incident infrared light, the temperatures of the beam (106) and the additional layer (107) also rise, causing thermal expansion. Due to the different CTE's of the different materials, the beam (106) bends upwards or downwards.

The beams (106) are arranged symmetrically across the structure as shown in FIG. 1B. Therefore, the suspending reflective layer (104) moves parallel to the substrate (101), causing the gap between the suspending reflective layer (104) and reflective layer (103) to change, as well as the resonant wavelength of the FP interferometer formed by suspending reflective layer (104), reflective layer (103) and the gap. As a result, the intensities of the transmitted or reflected reference light change. By measuring the change in the intensity of the transmitted or reflected reference light, the displacement of suspending reflective layer (104) can be calculated. Subsequently, the intensity of the incident infrared light (108) can be calculated.

Figure 1D:
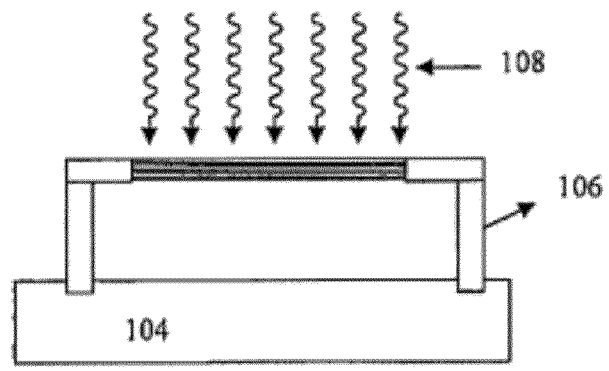

An alternative structure of the infrared sensor is illustrated in FIG. 1D. This infrared sensor does not include a reflective layer. It only comprises: a substrate (101), a suspending reflective layer (104) that suspends above the substrate (101), a gap formed by the suspending reflective layer (104) and the substrate (101), and a beam (106) that supports the layer (104) over the substrate (101). In this alternative configuration, the substrate (101), the layer (104) and the gap forms the interferometer. Similar to the above embodiment, when the suspending reflective layer (104) absorbs incident infrared light and its temperature rises, it causes the gap to change. By measuring the change in the intensity of the transmitted or reflected reference light, the intensity of the incident infrared light (108) can be calculated.

Figure 1E:
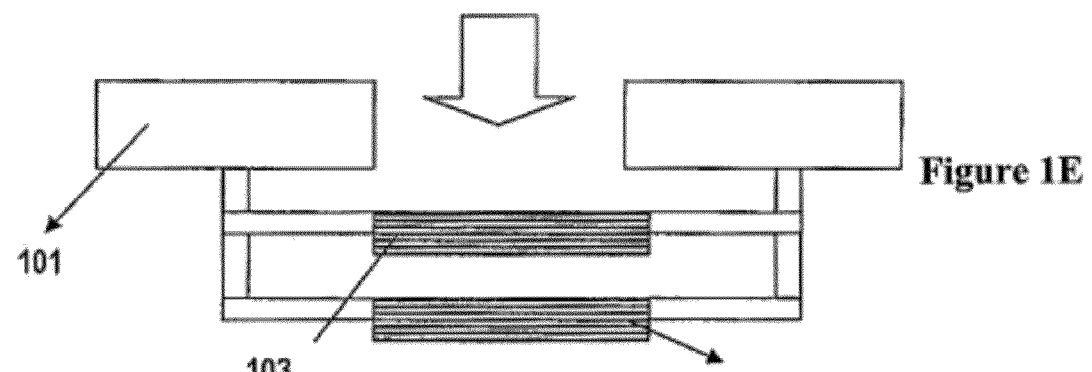
Figure 1F:
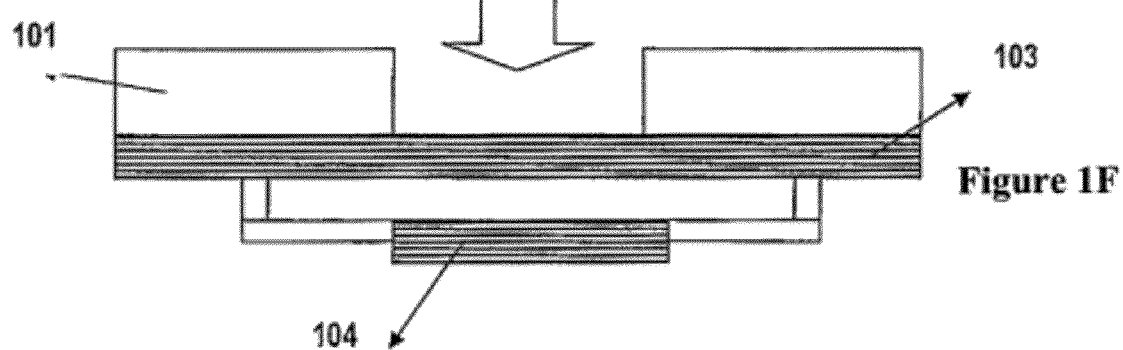

The infrared sensors in accordance with this invention can have many different structures. FIG. 1D-F shows some of the alternative structures. In FIG. 1D, the infrared sensor comprises a suspending reflective layer (104), a substrate (101), and a beam (106). In this alternative configuration, the substrate (101) functions as a reflective layer, or the substrate is integrated with the reflective layer. When the infrared light (108) is incident on the suspending reflective layer (104), the temperature of suspending reflective layer (104) rises and the gap between suspending reflective layer (104) and substrate (101) changes. As a result, the intensity of the transmitted or reflected reference light changes and the intensity of the infrared light can be calculated. In FIG. 1E, the substrate (101) is above the suspending reflective layer (104) and reflective layer (103). Part of the substrate is etched away to allow the passage of incident reference light or incident infrared light. The reflective layer (103) can be on the lower surface of the substrate (101), or suspended above the lower surface of the substrate (101) through a supporting structure. Similar to the principle illustrated above, as infrared light is incident from the same side as the reflective layer (103), reflective layer (103) absorbs more heat than the suspending reflective layer (104), causing the gap between suspending reflective layer (104) and reflective layer (103) to change, as well as the resonant wavelength of the FP interferometer formed by suspending reflective layer (104), reflective layer (103) and the gap. As a result, the intensities of the transmitted or reflected reference light of the FP interferometer change, and the intensity of the transmitted or reflected reference light (109) changes subsequently.

The configuration in FIG. 1F is similar to FIG. 1E, and the difference is that the reflective layer (103) is directly attached to the lower surface of the substrate (101) and is largely transparent to infrared light. When the infrared light is incident from the same side as layer (103), more light is absorbed by suspending reflective layer (104) than by reflective layer (103), causing the gap to change. The basic working principle of the infrared sensor in FIG. 1F is similar to that in FIG. 1E, and will not be repeated. Furthermore, the infrared sensor in accordance to this invention can have different configurations. For example, the reflective layer in FIG. 1F is above the suspending reflective layer, where the reflective layer transmits more infrared light and the suspending reflective layer absorbs more infrared light. The interference change upon the absorption of incident infrared light causes change in the intensity of reference light. Furthermore, the supporting mechanism of the suspending reflective layer can be attached to the substrate, or the reflective layer, or the supporting mechanism of the reflective layer, as long as it keeps the suspending reflective layer suspended. Furthermore, the substrate can be selected to have various functions. For example, the substrate can be CMOS or CCD imager circuits or wafers. Furthermore, besides the infrared sensors of this invention, the substrate can have other circuits or devices, such as imaging circuits, control circuits, etc.

Figure 1G:
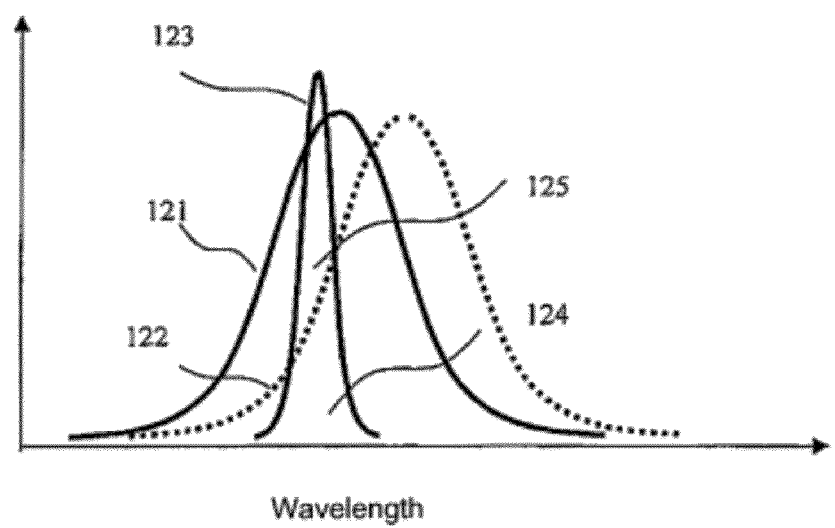

FIG. 1G shows the spectra of an infrared sensor and a reference light in accordance to one embodiment of the invention. Curve (121) is the transmission spectrum of infrared sensor when there is no incident infrared light. When infrared light is incident on the sensor, the temperature of the suspending reflective layer (104) changes for absorbing infrared light, the suspending reflective layer (104) and the beam (106) expands, causing the suspending reflective layer (104) to move vertically. The gap between the suspending reflective layer (104) and the reflective layer (103) changes, resulting in the new spectrum as shown by curve (122). In addition to the change in resonant wavelength, the shape of the spectrum may also change. The spectrum of the reference light is shown by curve (123). When there is no incident infrared light, the intensity of the transmitted reference light is the intensity of the reference light multiplied by the transmitivity of the sensor, illustrated by the overlapped area (124) of the two curves.

When there is incident infrared light, the intensity of the transmitted reference light is increased, the increased intensity is illustrated by the area (125).

Therefore, using MEMS fabrication techniques, a FP interferometer is created by the suspending reflective layer (104), the reflective layer (103), and the air or vacuum gap between the two layers. The FP interferometer also comprises a beam (106) that is made by different materials. When infrared light (108) is incident, the temperature of the suspending reflective layer (104) and the beam (106) changes, causing the gap between the two layers to change. The gap change shifts the resonant wavelength of the FP interferometer, causing the transmission of the reference light (102) to change. The infrared sensor in accordance to this invention is sensitive, has fast response time, is easy to fabricate, has good uniformity, and uses simple imaging system.

Figure 1H:
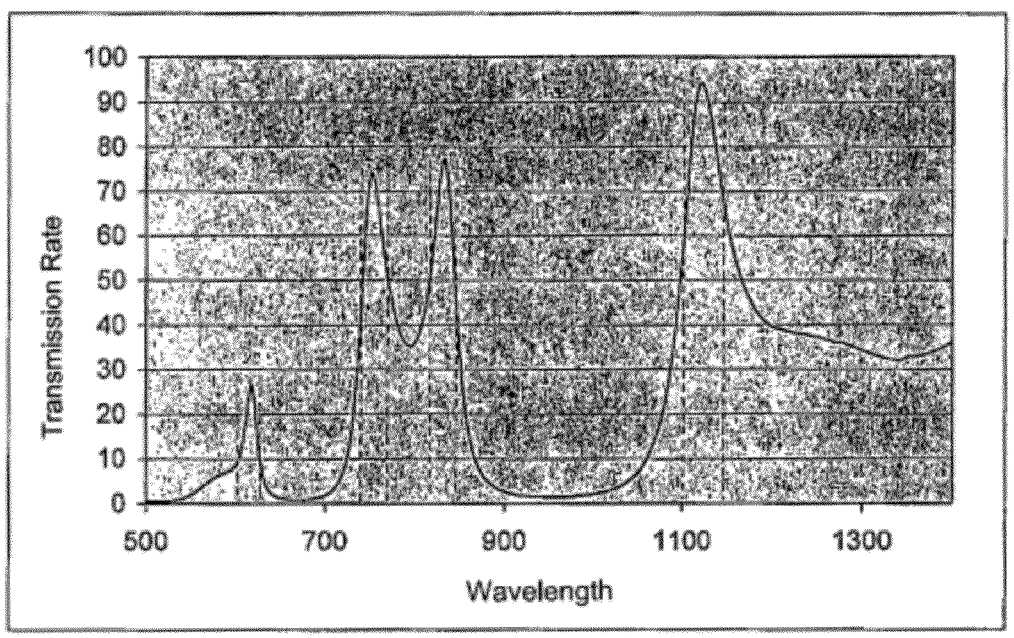

Based on the principle of resonance in a FP interferometer, the transmission or reflection of the reference light is very sensitive to the change of the gap distance. When less sensitivity is desired, the reflective films can be designed so that the interferometer has a broader spectrum. The intensity of transmission or reflection of the reference light is therefore less sensitive to the gap change. More broadly, the sensor can be constructed not as a strict FP interferometer, as long as the gap change results in the change of transmission or reflection of the reference light. For example, in FIG. 1H, the reflective layer and the suspending reflective layer of the infrared sensor in accordance to another embodiment of the invention are designed as the following: the substrate is a glass wafer, the lower reflective layer is a 200 nm a-Si layer. The suspending reflective layer is constructed, from top to bottom, as 50 nm a-Si/100 nm MgF2/400 nm SiN. The gap is 1200 nm. In this structure, neither the reflective layer nor the suspending reflective layer is a strict Bragg reflector. The simulated transmission curve of this structure is shown in FIG. 1H. This figure is for illustrative purpose only. The actual transmission curve may be different due to different materials or parameters. The simulated result shows that the spectrum of this structure changes as the gap changes. In this structure, the reference light can be selected to have a wavelength near the dashed lines in FIG. 1H. Around theses wavelengths, the transmission or reflection of the reference light changes as the gap changes, and therefore can be used as an infrared sensor in accordance with this invention.

In another embodiment, the infrared sensor can be adapted to detect other light at different wavelengths, such as ultraviolet light. For example, the suspending reflective layer absorbs light at certain wavelength, but not the reference light. On the other hand, the suspending reflective layer, the reflective layer, and the gap form an interferometer that transmits or reflects the reference light. The sensor is then a sensor for that wavelength. Preferably, the said light at certain wavelength is ultraviolet. Therefore, materials or number of layers can be selected to construct the suspending reflective layer or the reflective layer so that the suspending reflective layer absorbs light at certain wavelength, and the sensor then detects light at that certain wavelength. The materials and number of layers can also be selected to construct the suspending reflective layer and reflective layer not to be strict Bragg reflectors. The sensor can also detect light at the certain wavelength. Such variations are within the scope of this invention.

The infrared sensor in this embodiment has a suspending reflective layer (204) that is supported by beam (206). The beam is designed so that the suspending reflective layer (204) moves vertically and in parallel to the initial position as temperature changes. FIG. 2A-C shows the structure of a spinwheel beam (206) in an infrared sensor in accordance with one embodiment. The spin-wheel beam (206) can rotate around the suspending reflective layer (204), and is rotationally symmetric. The beam (206) has a beam body and an additional layer (210), as shown in FIG. 2A and 2C. The additional layer (210) can be attached to the upper or lower surface of the beam (206). In FIG. 2B, each beam has two additional layers (210). Each additional layer can be attached to the same side of the beam surface, such as the upper or the lower surface. In FIG. 2A-C, the additional layer (210) attached to beam (206) is usually made of metals with high CTE, and has a high conductivity. To increase the thermal insulation of beam (206) and therefore increase the temperature rise of the suspending reflective layer (204) when it absorbs incident infrared light, the length of beam (206) can be increased. In the spinwheel structure, part of the beam (206) can contain no metal so as to increase its thermal resistivity. Since the spinwheel structure has rotational symmetry, the suspending reflective layer (204) moves vertically and in parallel as temperature changes. The suspending reflective layer (204) can have various shapes, such as rectangle and hexagon.

FIGS. 3A-C show another configuration of the infrared sensor in accordance with another embodiment of the invention. The sensor has only one beam (306). It includes: a substrate (301), a reflective layer (303), a suspending reflective layer (304), a beam (306), and additional layers (310) and (310') attached to the beam (306). Part of the metal additional layer (310) is attached to the upper surface of the beam (306), part of the metal additional layer (310') is attached to the lower surface, as shown in FIG. 3B. When the temperature changes, the bending angle of the two parts cancel and the suspending reflective layer (not shown in the figure) moves in parallel. The advantage of the single beam structure is the low thermal conductivity and low stress. The single beam configuration can use a straight beam as shown in FIG. 3A, or a reflexed beam as shown in FIG. 3C. The reflexed single beam structure forms a regular and compact shape as the beam reflexes back and forth at one side of the suspending reflective layer (304).

FIG. 4A shows another configuration in accordance with another embodiment of the invention where reflexed beam (406A) forms a diagonally symmetric structure. The beam (406A) can be reflexed multiple times, and the displacement of each section adds up to increase the displacement of the suspending reflective layer. The structure in FIG. 4A is also a spinwheel structure, and the beam (406A) is also a spinwheel reflexed beam. FIG. 4B shows a minor symmetric reflexed beam (406B) in accordance with another embodiment of the invention.

In the beam structures described above, the different CTE's of the different materials in the beam cause the bending as temperature changes. Another embodiment is a microbridge structure that does not rely on the principle of different CTE's. In the microbridge structure, the thermal expansions of the suspending reflective layer and the beam create a vertical displacement of the suspending reflective layer. The beam can comprise a single material or a mix of several materials. No additional layer is needed. FIGS. 5A-5B show the top view and the cross-section view of a microbridge structure. The beam (506) can be made with one material, preferably, with low thermal conductivity. When the suspending reflective layer (504) absorbs infrared light and its temperature rises, the thermal expansion of the suspending reflective layer and the beam pushes the suspending reflective layer up or down, creating a change in the gap distance, subsequently causing the intensity of the transmitted or reflected reference light to change, which can be detected to measure the amount of incident infrared light.

The suspending reflective layer in this invention absorbs heat and generates a detectable signal as described above. At the same incident infrared light intensity, the more it absorbs, the more the temperature rises, the stronger is the signal. When the infrared light is incident on the suspending reflective layer, some is reflected, some absorbed to generate a detectable signal, and the rest transmitted. The transmitted infrared light reached the substrate and some is absorbed (not generating useful signal), some reflected, which may again be partly absorbed by the suspending reflective layer, and so on. The more reflected infrared light from the substrate, the more is being absorbed by the suspending reflective layer. FIG. 6 shows another embodiment that is designed to increase the infrared absorption of the suspending reflective layer. FIG. 6 shows various positions of a infrared reflective film (607) incorporated to increase the infrared reflectivity. The infrared reflective layer is films made of materials that are highly reflective to infrared light, including electrically conductive materials such as metals, ITO, InZnO and ZnO. The infrared reflective film (607) highly reflects infrared light. Therefore, the infrared reflective film (607) strongly reflects infrared light transmitted through the suspending reflective layer, allowing the suspending reflective layer to absorb more infrared light.

ITO, i.e., indium tin oxide, is widely used as transparent electrodes in LCD displays. It has the special property of being both transparent and electrically conductive. Other materials that have such property include indium zinc oxide (InZnO) and zinc oxide (ZnO). Therefore, the infrared reflective film (607) is preferably made of ITO, InZnO, or ZnO. These materials are highly reflective to infrared light because of the electrical conductivity. Therefore, transparent and conductive materials such as ITO can be deposited to the substrate to increase the absorption of infrared light by the suspending reflective layer. The transparent conductive materials such as ITO, when used to form infrared reflective film (607), can be directly coated on the substrate (601), or as one layer or more layers in the reflective layer (603), or on the upper surface or lower surface of the reflective layer (603), as shown in FIG. 6. When the infrared sensor operates at reflectance mode, the reference light is not required to transmit through the reflective layer (603) or the substrate (601). Therefore, opaque materials, such as metals, can be used in the reflective layer (603) or as the substrate (601).

In the above configurations, the structure moves as the temperature changes and generates signals. The temperature change of the structure is due to the absorption of incident infrared light, or due to environment temperature change around the sensor itself. Infrared sensors based on MEMS structures may not be able to differentiate between the two. For example, the bimorph structures bend when incident infrared light is absorbed. On the other hand, the temperature change of the sensor environment creates bending as well. If the bending due to different reasons can not be differentiated, false infrared image is created. To prevent the false infrared image, the infrared sensor pixels can be controlled at a precise temperature, which is difficult. Or, a sensor can be designed to respond only to incident infrared light, but not the temperature change of the environment. In order to create such effect, the environment temperature effect needs to be compensated, so that the sensor only responds to incident infrared light. FIG. 7A-7C shows a configuration of this concept in accordance with one embodiment of the invention.

FIG. 7A illustrates the temperature compensation method of one embodiment. The beam comprises three sections: a first section that is close to the substrate, with an additional layer; a second section that is close to the suspending reflective layer, with an additional layer; and a third section that is between the above two sections, used for thermal insulation. When environment temperature changes, the displacements of the first and second sections cancel each other, causing no displacement of the suspending reflective layer. FIG. 7B shows an example where the beam is straight. The materials of the additional layers can be different. For example, the material of the upper additional layer is different from that of the lower additional layer. The dashed lines in FIG. 7A and 7B illustrate the bending of the beams when environment temperature changes. In an ideal situation, the end of the beam does not move when the bending of each section cancels. When infrared light is incident and absorbed, the temperature gradient between the suspending reflective layer and the substrate causes the beam end to move, as the displacement in each section does not cancel each other.

Another example is illustrated in FIG. 7C. The beam comprises three sections: a first section that is close to the substrate, containing an additional layer (710); a second section that is close to the suspending reflective layer (704), containing an additional layer (711); and a third section between the first and second sections, without any additional layer, as the thermal insulator. When environment temperature changes, the displacements of the first section and the second section cancel each other, causing no displacement of the suspending reflective layer (704). When infrared light is incident on the suspending reflective layer, however, a temperature gradient is created from the suspending reflective layer (704) and the substrate. The second section, which is close to the suspending reflective layer (704), has a temperature that is close to that of the suspending reflective layer (704) and causes a displacement. The first section, which is close to the substrate, has a temperature that is close to the substrate, and created little or no displacement. The displacements of these two sections thus do not cancel each other. As a result, the suspending reflective layer moves, generating signals.

To make the first section and the second section move in opposite directions, the additional layers (710) and (711) are arranged in opposite: the additional layer (710) includes a first additional layer (710') and a second additional layer (710"), the additional layer (711) includes a third additional layer (711') and a fourth additional layer (711"). The additional layer in (710) that is close to the additional layer in (711) are attached to the same side, i.e., the second additional layer (710") of (710) is at the same side with the third additional layer (711'), e.g., the lower surface of the beam. The additional layer in (710) that is farther from the additional layer in (711) is attached to another side, i.e., the first additional layer (710') in (710) is at the same side as the fourth additional layer (711") in (711), e.g., the upper surface of the beam. This arrangement creates a temperature compensation mechanism. The number of said additional layers can be chosen as needed, as long as the section close to the suspending reflective layer (704) has a displacement that cancels that of the section close to the substrate (701) as environment temperature changes.

Another embodiment is to use double suspending layer to implement temperature compensation. FIG. 8 shows a double suspending layer structure used for temperature compensation in accordance with one embodiment of the invention. In this configuration, the lower reflective layer is also suspended, similarly supported by a beam as shown in FIG. 1A. The first suspending reflective layer (804), the second suspending reflective layer (806), and the gap between them form an interferometer, wherein the first suspending reflective layer (804) is supported by the beam (810) which is attached to the substrate. The second suspending reflective layer (806) is supported by beam (811) which is attached to the substrate. When environment temperature changes, both suspending reflective layer moves by the same amount, keeping the gap unchanged. When infrared light is incident, the first suspending reflective layer (804) absorbs more than the second suspending reflective layer (806). The displacements of the two layers are different, and the gap changes so as to generating a signal. Therefore, this structure is insensitive to environment temperature change but is sensitive to incident infrared light. Thus, temperature compensation is realized.

In this structure, to further differentiate the absorption of the first suspending reflective layer (804) and the second suspending reflective layer (806), a metal or transparent conductive layer such as ITO can be inserted into the second suspending reflective layer (806) to increase the infrared reflectivity. It increases the absorption by the first suspending reflective layer (804) and substantially decreases the absorption by the second suspending reflective layer (806) (even to almost zero). FIG. 8 is for illustrative purposes only. In practice, the beam length of the first suspending reflective layer (804) and the second reflective layer (806) can be selected as needed. Preferably, the beam length of the first suspending reflective layer (804) and the second suspending reflective layer (806) are designed to be the same and have the same structure. However, different lengths or structures can also be selected based on actual needs.

Another method in accordance with one embodiment of the invention to implement temperature compensation is to use blind pixels. When temperature compensation is not used in the infrared sensor, or temperature compensation is not perfect, the false image can still be calculated if the environment temperature of the sensor is known, and the infrared image can be recovered by removing the false image. To detect the environment temperature of the infrared sensors, blind pixels can be inserted to the sensor array. A blind pixel in accordance with an embodiment of the invention is a structure that is insensitive or not very sensitive to incident infrared light, but very sensitive to environment temperature. The environment temperature of the infrared sensors can be measured by using the characteristics of the blind pixels. An infrared sensor array may have an uneven temperature profile across the array. An array of blind pixels can be inserted to the infrared sensor array, e.g., one blind pixel in every 10×10 infrared sensor pixels. By measuring the temperature of each blind pixel, the temperature distribution of the infrared sensor array can be calculated.

In this configuration, only one percent of the pixels are blind pixels. The infrared image in the blind pixels can be interpolated from surrounding infrared sensors. Blind pixels are only sensitive to its environment temperature, not to the incident infrared light. FIG. 9A shows a blind pixel that comprises: a substrate (901), a reflective layer (904), a reflective layer (903) that is attached to the substrate (901), medium that is between the reflective layers (903, 904). The reflective layers (903, 904) and medium (905) forms an interferometer. When environment temperature changes, the refractive index of the medium changes, shifting the spectrum of the interferometer and causing the intensity of transmitted or reflected reference light to change. The environment temperature can then be measured. When infrared light is incident, the temperature of the blind pixel does not change due to its good thermal contact to the substrate, and therefore not sensitive to incident infrared light.

FIG. 9B shows another configuration of the blind pixel. By establishing good thermal contact between the suspending reflective layer (904) and the substrate, or making the suspending reflective layer not absorb infrared light, the incident infrared light does not heat up the blind pixel. The structure is similar to the infrared sensors described in this invention, and the difference is that the thermal conductivity of the beam (906) is increased so that the incident infrared light does not heat up the suspending reflective layer to generate a signal. To increase the thermal conductivity, the beam width, thickness, cross-section area or the number of beams is increased. Or materials with high thermal conductivity, such as metals, are used in the beam. The beam (906) can comprise two layers of metals to increase response to environment temperature change. When the environment temperature changes, it causes changes in the gap distance and the intensity of the transmitted or reflected reference light from the first film structure and the second film structure. Thus, the environment temperature can be measured by detecting the intensity of the transmitted or reflected reference light from the first film structure and the second film structure. In another example as shown in FIG. 9C, the suspending reflective layer (904) has an infrared reflective film (907), such as ITO. The incident infrared light is reflected and not absorbed by the suspending reflective layer, its temperature does not change and no signal is generated. In FIG. 9C, the infrared reflective film can also be at the lower surface, or somewhere in the middle, of the suspending reflective layer (904). To simplify the figure, the reflective layer and the beam are not shown.

The infrared reflective film can also be incorporated into the blind pixels shown in FIGS. 9A-9C and any other blind pixels so that they do not absorb incident infrared light.

In the embodiments of the invention described above, the additional layer can be an independent part attached to the beam, or being part of the beam.

The infrared sensors described above can be arranged to form an array, i.e., focal plane array (FPA). The infrared sensor can be any sensor in accordance with embodiments of this invention. Alternatively, the FPA can also incorporate any of the infrared sensor and blind pixels in accordance with embodiments of the invention. The FPA comprising any of the infrared sensors or comprising any of the infrared sensors and the blind pixels can be used in an infrared imaging system. The infrared imaging system in accordance with this invention includes a reference light source, a FPA in accordance with this invention, and a detector that detects the intensity of the readout reference light. In the infrared imaging system in accordance with this invention, when the infrared sensors absorb infrared light, the transmitted or reflected reference light out of the FPA changes and is detected by the detector to form an image, and the infrared light is easily measured.

The material combination in accordance with this invention refers to a mix of materials, or separate layers of different materials. The beam and additional layer in accordance with this invention can contain different materials or layers of different materials. The CTE of these materials can be different. In such instances, the beam consisting of different materials or layers of different materials is considered as one integrated beam with a CTE of its own, and is referred as a material combination with a first CTE. The additional layer consisting of different materials or layers of different materials is treated as one integrated layer, and is also referred as a material combination with a second CTE.

The additional layer in this invention is more broadly defined in functional terms as a structure whose displacement and the displacement of other layers cause the displacement of the supporting structure when temperature changes. Therefore, the additional layer in accordance with this invention can be any layer that is attached to the beam. Or, if the beam has two or more layers, any of the layers can be considered as an additional layer, and the rest considered as a whole, namely the beam itself.

The figures illustrate the principle of infrared sensor in accordance with the invention that utilizes the transmission of a reference light. This invention can also use the reflected reference light to detect the incident infrared light. The basic principle of reflection mode is similar to the transmission mode. The difference is that reflected reference light is used to detect the change in the pixel instead of the transmitted reference light. The basic principle of the reflection model is not described here so as not to obscure this invention.

Different embodiments of this invention have been described, but the scope of the invention is not to be limited by these exemplary embodiments. For instance, the beam can be different than those disclosed in the exemplary embodiments, and its shape, thickness, and lengths can be selected based on the needs of specific implementations. The shapes of the suspending reflective layer or the reflective layer, the number of layers or types of materials in the suspending reflective layer or the reflective layer can be selected based on the needs of specific implementations, and can be different from those in these exemplary embodiments. People in this field might think of or make various modification or additions that are still within the scope of this invention. This invention is not limited by the exemplary embodiments disclosed, but includes all modifications, combinations, or replacements that are within the scope of the claims. The preferred embodiments of this invention are disclosed for the purpose of illustration this invention, not for limiting this invention.

What is claimed is:

1. An infrared sensor for detecting infrared light, comprising:
    a reference light source;
    a first film structure;
    a second film structure;
    a gap between said first film structure and said second film structure;
    a first supporting mechanism for supporting said first film structure on a substrate;
    wherein said first film structure, said second film structure, said gap form an interferometer; and
    wherein the intensity of a portion of a reference light generated by said reference light source changes when an infrared light is incident upon said infrared sensor.

2. The infrared sensor of claim 1, wherein said second film structure is directly attached to said substrate.

3. The infrared sensor of claim 1, wherein said first supporting mechanism comprises a beam having a first end connected to said first film structure, and a second end connected to at least one of said substrate and said second film structure.

4. The infrared sensor of claim 3, wherein said beam comprises a first material comprising a first coefficient of thermal expansion (CTE), and a second material comprising a second CTE, wherein said first CTE is different from said second CTE.

5. The infrared sensor of claim 4, wherein said second material comprises a CTE larger than that of the first material by 50% and is configured as a layer of material attached to the first material of the beam.

6. The infrared sensor of claim 4, wherein said second material is selected from a group consisting of Aluminum and Gold.

7. The infrared sensor of claim 1, further comprises a second supporting mechanism for supporting said second film structure on said substrate.

8. The infrared sensor of claim 1, wherein said first film structure comprises an infrared absorptive film.

9. The infrared sensor of claim 1, wherein said second film structure comprises an infrared reflective film.

10. The infrared sensor of claim 1, wherein said infrared reflective film is transparent to said reference light and electrically conductive.

11. The infrared sensor of claim 1, wherein said first supporting mechanism comprises a microbridge having at least two mirrorly symmetric and straight beams supporting said first film structure.

12. The infrared sensor of claim 1, wherein said first film structure comprises at least two layers of material, wherein said layers of material are symmetrically arranged.

13. The infrared sensor of claim 1, wherein said first film structure comprises a layer of material selected from a group consisting of: silicon oxide (SiO2), silicon nitride (SiNx) and amorphous silicon (a-Si).

14. The infrared sensor of claim 1, wherein said first film structure comprises a five layer symmetric structure selected from a group consisting of: a-Si/SiO2/a-Si/SiO2/a-Si and SiNx/SiO2/a-Si/SiO2/SiNx.

15. The infrared sensor of claim 1, wherein said first film structure comprises a layer of material having a thickness within the range of 50% to 150% of a quarter wavelength of the reference light in the material.

16. The infrared sensor of claim 1, wherein said second film structure is part of said substrate.

17. The infrared sensor of claim 1, wherein said substrate is highly reflective to infrared light.

18. The infrared sensor of claim 1, wherein part of said substrate is etched away to allow the passage of reference light.

19. The infrared sensor of claim 9, wherein said second film structure comprises a material selected from ITO, ZnO, InZnO.

20. The infrared sensor of claim 1, wherein said first film structure absorbs at least one of ultraviolet light and milliwave light.

21. The infrared sensor of claim 1, wherein said substrate comprises a CMOS circuit or a CCD circuit.

22. The infrared sensor of claim 1, wherein said gap changes due to the thermal expansion of said first supporting mechanism when an infrared light is incident upon said infrared sensor.

23. The infrared sensor of claim 1, wherein said portion of said reference light is transmitted through said substrate.

24. The infrared sensor of claim 1, wherein said portion of said reference light is reflected from said substrate.

25. An infrared sensor for detecting infrared light, comprising:
    a reference light source;
    a first film structure comprising an infrared absorptive film;
    a second film structure comprising a material selected from indium tin oxide (ITO), zinc oxide (ZnO), indium zinc oxide (InZnO);
    a gap between said first film structure and said second film structure;
    a substrate;
    a first supporting mechanism for supporting said first film structure on said substrate;
    wherein said first film structure, said second film structure, and said gap form an interferometer; and
    wherein the intensity of a transmitted or reflected portion of a reference light generated by said reference light source changes when an infrared light is incident upon said infrared sensor.

26. An infrared sensor for detecting infrared light, comprising:
a reference light source;
a first film structure comprising an infrared absorptive film;
a second film structure;
a gap between said first film structure and said second film structure;
a first supporting mechanism for supporting said first film structure on a substrate;
wherein said first film structure, said second film structure, said gap form an interferometer;
wherein the intensity of a portion of a reference light generated by said reference light source changes as said gap changes due to the thermal expansion of said first supporting mechanism when an infrared light is incident upon said infrared sensor.

27. The infrared sensor of claim 26, wherein said portion of said reference light is transmitted through said substrate.

28. The infrared sensor of claim 26, wherein said portion of said reference light is reflected from said substrate.

29. The infrared sensor of claim 26, wherein said first supporting mechanism is arranged in such a way so that said gap between said first film structure and said second film structure does not change when the environment temperature of the infrared sensor changes.

30. The infrared sensor of claim 26, further comprises a second supporting mechanism for supporting said second film structure on said substrate, wherein said first supporting mechanism and said second supporting mechanism are arranged in such a way so that said gap between said first film structure and said second film structure does not change when the environment temperature of the infrared sensor changes.

31. The infrared sensor of claim 26, wherein said first supporting mechanism comprises a beam having a first section connected to said first film structure and a second section connected to at least one of said substrate and said second film structure, and a thermally insulating section between said first section and said second section.

32. The infrared sensor of claim 31, wherein said first section is identical or symmetrically arranged with said second section.

33. The infrared sensor of claim 31, wherein said beam comprises a first material with a first coefficient of thermal expansion (CTE), and a plurality of additional layer comprising a second material with a second CTE, wherein said first CTE is different from said second CTE.

34. The infrared sensor of claim 33, wherein said second material has a CTE larger than that of said first material by 50% and is configured as a layer of material attached to said first material of the beam.

35. The infrared sensor of claim 33, where said first material and said second material are arranged so that when the environment temperature of the infrared sensor changes, said gap does not change due to the thermal expansion of said first supporting mechanism.

36. The infrared sensor of claim 31, wherein said first section of said beam has good thermal contact with said first film structure, said second section of said beam has good thermal contact with at least one of said substrate and said second film structure.

37. The infrared sensor of claim 31, wherein said first section and said second section of said beam moves in opposite directions when the environment temperature of the infrared sensor changes.

38. The infrared sensor of claim 31, wherein said first section and said second section of said beam move in directions that minimize the change in said gap when the environment temperature of the infrared sensor changes.

39. An infrared imaging system that comprises:
a reference light source;
a detector for detecting the reference light intensity; and
a focal plane array comprising an infrared sensor for detecting infrared light, the infrared sensor comprising
a first film structure;
a second film structure;
a gap between said first film structure and said second film structure;
a first supporting mechanism for supporting said first film structure on a substrate or said second film structure;
wherein said first film structure, said second film structure, said gap form an interferometer;
wherein the intensity of a portion of transmitted or reflected reference light generated by said reference light source changes when an infrared light is incident upon said infrared sensor.

40. An infrared imaging system of claim 39, wherein the focal plane array further comprises a blind pixel for detecting environment temperature.

41. An infrared imaging system of claim 40, wherein the intensity of said reference light transmitted through said blind pixel does not change when infrared light is incident upon said blind pixel.

42. An infrared imaging system of claim 40, wherein the intensity of said reference light transmitted through said blind pixel changes when environment temperature changes.

43. An infrared imaging system of claim 40, wherein said blind pixel does not absorb incident infrared light.

44. The infrared imaging system in claim 40, wherein a portion of said blind pixel has good thermal contact with said substrate.

45. The infrared imaging system in claim 39, wherein the reference light source is a light emitting diode.

46. The infrared imaging system of claim 39, wherein said detector is a CCD or CMOS imaging sensor.

* * * * *